United States Patent [19]

Buma et al.

[11] Patent Number: 4,666,135

[45] Date of Patent: May 19, 1987

[54] AIR SUSPENSION

[75] Inventors: Shuuichi Buma; Yuji Yokoya; Hitoshi Araki, all of Toyota; Masanori Hirose, Okazaki; Hiroshi Miyata, Toyota; Kaoru Ohashi, Okazaki, all of Japan

[73] Assignee: Toyota Jidosha Kabushiki Kaisha, Toyota, Japan

[21] Appl. No.: 793,908

[22] Filed: Nov. 1, 1985

[30] Foreign Application Priority Data

Dec. 12, 1984 [JP] Japan .................. 59-260691

[51] Int. Cl.$^4$ .............................. F16F 9/08
[52] U.S. Cl. ................... 267/64.21; 280/707
[58] Field of Search ............ 267/64.21, 64.22, 64.24, 267/64.25, 64.28; 280/707

[56] References Cited

U.S. PATENT DOCUMENTS

| 3,954,256 | 5/1976 | Keijzer et al. | 267/64.21 |
| 4,534,580 | 8/1985 | Kobayashi et al. | 267/64.24 X |
| 4,568,101 | 2/1986 | Bleustein et al. | 280/707 |
| 4,588,171 | 5/1986 | Stephens | 267/64.24 |

Primary Examiner—Duane A. Reger
Attorney, Agent, or Firm—Oblon, Fisher, Spivak, McClelland & Maier

[57] ABSTRACT

An air suspension system which includes an air spring provided between a car body and a suspension arm for adjusting the car height by changing the volume of the air spring. The air spring includes a diaphragm and an air piston formed to contact with the diaphragm. The air piston has a plurality of wall portions arranged longitudinally. Each wall portion is different in its external shape from the portion adjacent thereto. The external shapes of the air piston includes a combination of at least two shapes of the group including a straight cylindrical shape, a tapered shape converging downward and a tapered shape diverging downward.

7 Claims, 6 Drawing Figures

AIR SUSPENSION

BACKGROUND OF THE INVENTION

1. Field of the Invention

This invention relates to an air suspension system, and more particularly to an air suspension system for a vehicle which can adjust a car height by changing the volume of an air spring.

2. Description of the Prior Art

An air suspension capable of adjusting the car height is provided with an air spring between a car body and a suspension arm. By changing the volume of compressed air in the air spring the car height can be adjusted to be high, normal or low for example. However, since the spring constant of the air spring is given as a function of the volume, the spring constant of the air spring automatically changes with every adjustment of the car height.

By changing the spring constant of the air spring, the following problems are presented.

For example, when an automobile travels on a bad road and the car height is increased, the spring constant is reduced so that so-called bottoming is caused so as to provide a worse ride. Also, a small spring constant produces fluttering so that contact of the wheel to the ground and thus controllability are degraded.

When the car height is reduced in high speed travelling, the spring constant is enlarged so as to result in a worse ride.

In an air suspension disclosed in the Japanese Patent Public Disclosure (KOKAI) No. 75813/84, a helper or a bound stopper disposed in an air spring is formed to be moved by a cylinder mounted in the air spring. Thus, the distance between the helper and the cylinder is maintained constant according to the signal of a helper position sensor. According to the air suspension, when the car height is increased to reduce the spring constant, bottoming out can be prevented and riding comfort can be improved.

However, no corrective measure is taken for the increase in the spring constant, and since the helper is moved by the cylinder disposed in the air spring, the volume of the air spring is changed by movement of the cylinder itself.

SUMMARY OF THE INVENTION

An object of the present invention is to provide an air suspension system which can adjust the car height to reduce the change in the spring constant.

A further object of the present invention is to provide an air suspension which can reduce the change in the spring constant without providing any operating means such as the cylinder in the air spring.

A still further object of the present invention is to provide an air suspension which can bring about a preferable condition of the spring constant according to the travelling condition.

According to the present invention, an air suspension is provided with an air spring between a car body and a suspension arm and a car height can be adjusted by changing the volume of the air spring. The air spring comprises a diaphragm and an air piston formed to contact with the diaphragm and having a plurality of portions arranged longitudinally, each portion being different in its external shape from the portion adjacent thereto.

An another air suspension according to the present invention comprises a shock absorber, an air spring capable of adjusting a car height by changing the volume thereof and provided with a diaphragm and an air piston formed to contact with the diaphragm and having a plurality of portions arranged longitudinally, each portion being different in its external shape from the portion adjacent thereto and a control unit for adjusting the spring constant of the air spring according to the travelling condition, the control unit, when the spring constant is to be changed, adjusting the car height simultaneously to bring said diaphragm to a position on said air piston which position is suitable for the travelling condition.

A still further air suspension according to the present invention comprises a shock absorber, an air spring capable of adjusting the car height and including a main air chamber surrounding the shock absorber and provided with a diaphragm and an air piston formed to contact with the diaphragm and having a plurality of portions arranged longitudinally, each portion being different in its external shape from the portion adjacent thereto and an auxiliary air chamber capable of communicating to or being insulated from the main air chamber, and a control unit for adjusting the spring constant of the air spring according to the travelling condition, the control unit, when the spring constant is to be largely changed, affording or interrupting communication between said main and auxiliary air chambers while adjusting the car height simultaneously to bring said diaphragm to a position, or the control unit, when the spring constant is to be slightly changed, adjusting the car height simultaneously to bring said diaphragm to a position on said air piston which position is suitable for the travelling condition.

When the diaphragm is located in a position on the air piston the shape of which diverges downward and the wheel bounds, an effective diameter or pressure receiving area of the diaphragm is enlarged and the spring constant tends to increase. On the contrary, when the diaphragm is located in a position on the air piston the shape of which converges downward and the wheel bounds, the pressure receiving area of the diaphragm is reduced and the spring constant tends to decrease.

When the air spring consists of the main and auxiliary air chambers, the air suspension is provided with the control unit and the spring constant needs to be largely changed, the control unit affords or interrupts communication between the main and auxiliary air chambers and adjusts the car height simultaneously. When a preferrable travelling condition is attained by changing the spring constant slightly, the control unit adjusts the car height upward or downward to make the diaphragm contact the optimum position on the air piston.

According to the present invention the following effects are obtained.

Since the condition of the spring constant suited for the car height can be provided by the external shapes of the air piston, the riding comfort and controllability are improvided.

Since the external shapes of the air piston can be changed according to a vehicle type and an object of using the vehicle, the condition of the spring constant suited for the car height can be provided without necessarily resulting in a cost increase.

By combination of the fact that the car height is adjusted by the control unit to make the diaphragm contact a surface of the piston having a preferable shape and the fact that the main and auxiliary air chambers of the air spring communicate with or are insulated from each other, the selective range of the spring constant for providing the spring characteristic suited for the travelling condition is enlarged. As a result, for example, the occurrence of bottoming or bad contact property of the wheel to the ground in travelling of the automobile on a bad road can be restrained.

When the damping force of the shock absorber is also adjusted like that in an embodiment of the present invention, the damping force of the shock absorber together with the spring constant can be adjusted to synthetically provide a improved ride comfort and controllability.

BRIEF DESCRIPTION OF THE DRAWINGS

Other objects and features of the present invention will become apparent from the following description of preferred embodiments of the invention with reference to the accompanying drawings, in which.

DESCRIPTION OF THE PREFERRED EMBODIMENTS

Figure 1:
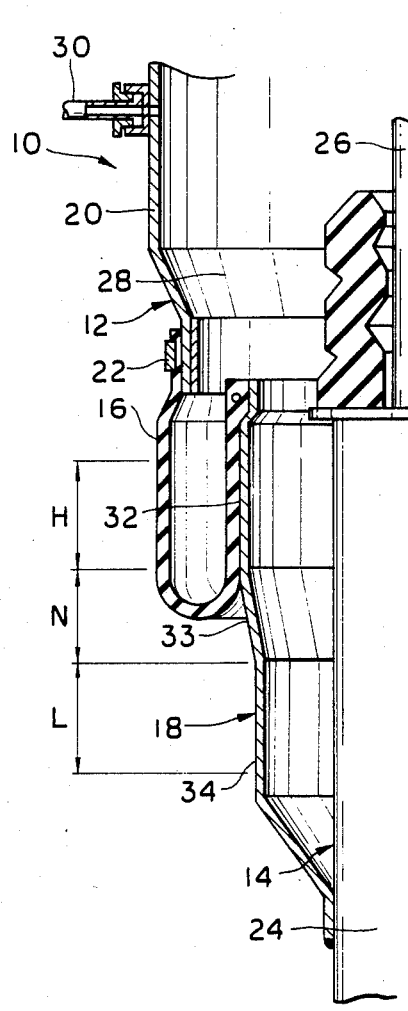
FIG. 1 is a sectional view showing the left half of an air suspension system.

As shown in FIG. 1, an air suspension system 10 includes an air spring 12. The air spring 12 is provided between a car body and a suspension arm (not shown) to absorb vibration applied to a wheel in cooperation with a shock absorber 14. In an embodiment shown, the air spring 12 is formed to surround the shock absorber 14.

The air spring 12 comprises a diaphragm 16, an air piston 18 and a housing 20. The diaphragm 16 is cylindrically formed of rubber so as to be bent approximately at a central portion. An inside end of the diaphragm 16 is fitted in the air piston 18 and an outside end is fixed to the housing 20 by caulking a ring 22. The air piston 18 is welded to a cylinder 24 of the shock absorber 14 under the air tight condition. The housing 20 is fixed to a piston rod 26 or the car body under an air tight condition. These members form an air chamber 28 surrounding the shock absorber 14.

A hose 30 is connected to the air chamber 28. When compressed air is supplied to the air chamber 28 through the hose 30 from an air source (not shown), the air chamber 28 increases its volume so as to increase the car height. Also, when a change-over valve (not shown) connected to the hose 30 is changed over, the compressed air in the air chamber 28 is ejected to the atmosphere to reduce the volume of the air chamber 28 and reduce the car height.

The air piston 18 is formed to contact with the diaphragm 16 and has a plurality of wall portions arranged longitudinally, each portion being different in its external shape from the portion adjacent thereto. As shown in FIG. 1, the air piston 18 has three portions 32,33 and 34 to which the diaphragm 16 is opposed when the car body is located in high H, normal N and low L respectively. The portions 32,33 and 34 are formed respectively into a straight cylindrical shape, a tapered shape converging downward and a straight cylindrical shape. As a result, when the car height is in H or L, the diaphragm 16 contacts a surface of the straight cylindrical shape. When the wheel bounds, the spring constant is changed by the reduction of the volume of the air chamber 28. That is, the spring constant is slightly increased. However, when the car height is in N, the diaphragm 16 contacts a surface of the converging tapered shape. When the wheel bounds, the spring constant is on one hand increased by the reduction of the volume and on the other hand reduced by the reduction of the pressure receiving area, i.e., the area obtained from the effective diameter of the diaphragm. In other words, the degree of change in the spring constant when the car height is in normal N is smaller than that when the car height is otherwise located.

Figure 2:
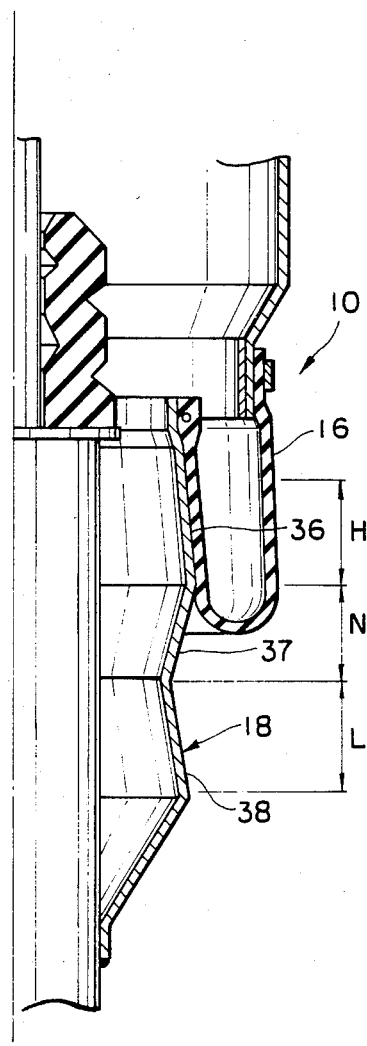
FIG. 2 is a sectional view showing the right half of a different embodiment of the air suspension system.

Each of the shapes of the air piston 18 can be formed into various ones in consideration of different car types and objects of using cars. FIG. 2 shows an embodiment of the air piston 18 having different shapes. In this embodiment, portions 36,37 and 38 of the air piston 18 to which the diaphragm 16 is opposed when the car height is located in high H, normal N and low L are formed respectively with a tapered shape diverging downward, a tapered shape converging downward and a tapered shape diverging downward. And the tapered shape in high H and the tapered shape in low L differ from each other as to a taper angle. As a result, when the car height is in H or L, the diaphragm 16 contacts a surface of the diverging tapered shape. When the wheel bounds, the spring constant is on one hand increased by the reduction of the volume and on the other hand increased by the increase of the pressure receiving area. Further, since the taper angles are different from each other when the car height is at H and L, the degree of increasing the spring constant varies.

When the car height is at N, the diaphragm 16 contacts a surface of the converging tapered shape. When the wheel bounds, the spring constant is on one hand increased by the reduction of the volume and on the other hand reduced by the reduction of the pressure receiving area.

Figure 3:
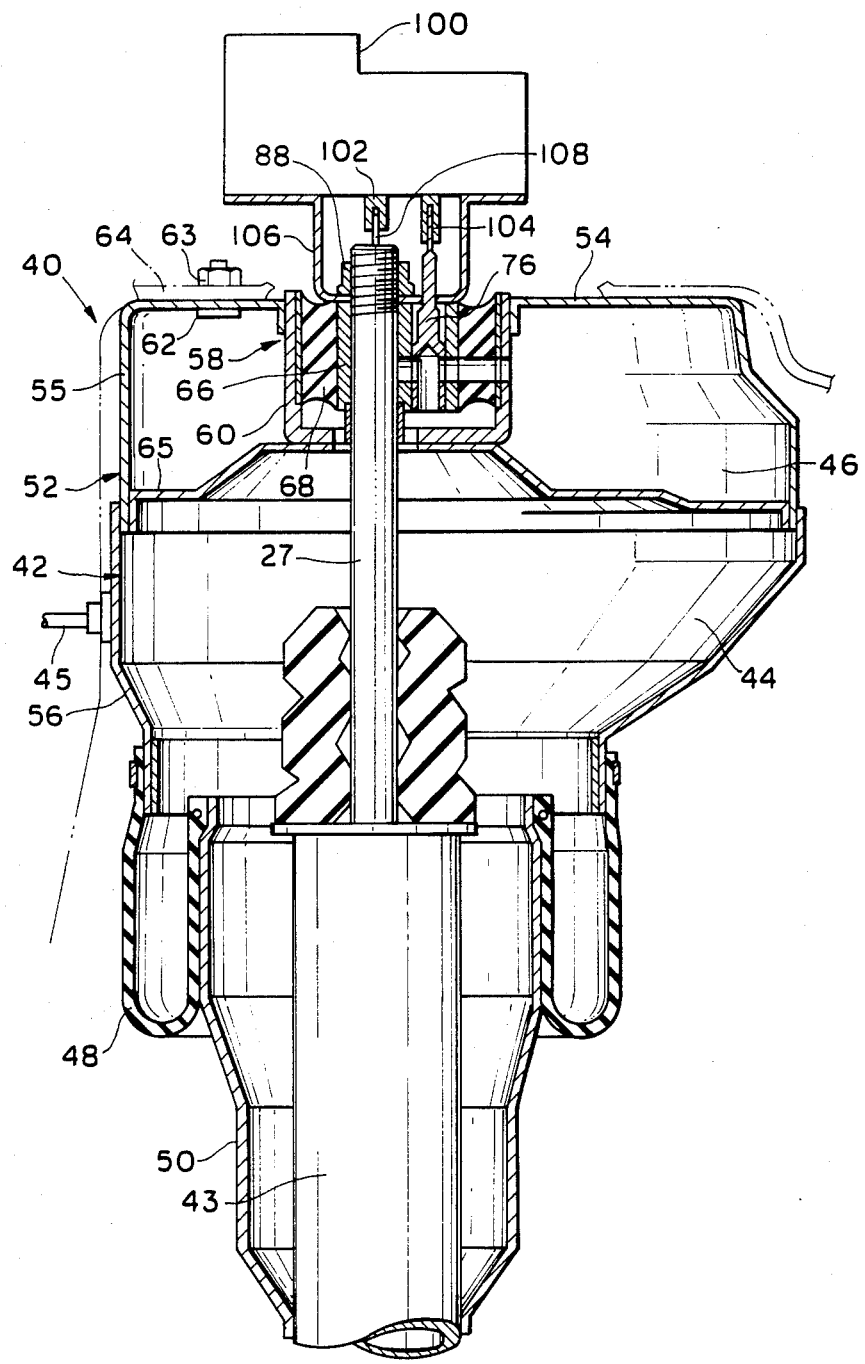
FIG. 3 is a sectional view showing a still further embodiment of the air suspension system.

An air suspension system 40 shown in FIG. 3 comprises an air spring 42 provided with a main air chamber 44 formed to surround an upper portion of a shock absorber 43 and an auxiliary air chamber 46 which can communicate to or be insulated from the main air chamber 44.

The shock absorber 43 is preferably of a so-called type capable of adjusting the damping force. In the type of shock absorber, a piston rod 27 has a bypass path for affording communication between two liquid chambers partitioned above and below the piston, and a control rod disposed in the piston rod 27 opens and closes the bypass path. When the control rod opens the bypass path and the piston moves, liquid in one liquid chamber flows through the bypass path in the piston rod in addition to ports inherently provided in the piston so that liquid amount flowing through the ports is reduced to reduce the damping force of the shock absorber. When the control rod closes the bypass path, the liquid flows through only the ports in the piston so that the damping force is increased.

The main air chamber 44 is formed in cooperation of a diaphragm 48, an air piston 50 and a housing 52. The diaphragm 48 and air piston 50 has the same construction as the diaphragm 16 and air piston 18 shown in FIG. 1.

The housing 52 has a ceiling portion 54 having an inner peripheral edge welded over the whole periphery to a support member 60 of a support 58, a tube portion 55, extending from the ceiling portion 54 integrally downward and a tube portion 56. To the ceiling portion 54 of the housing 52 are welded a plurality of bolts 62 (one bolt is shown in the drawing) under an air tight condition. These bolts 62 extend through a car body 64 and nuts 63 are screwed onto the bolts 62. Thus, the housing 52 is connected to the car body 64. To the tube portion 55 of the housing 52 is welded an outer peripheral edge of the partition plate 65, and an inner peripheral edge of the partition plate 65 is welded to the support member 60 to define the auxiliary air chamber 46. The tube portion 56 of the housing 52 is fitted in the tube portion 55 and welded over the whole periphery thereto. To the tube portion 56 is fixed the diaphragm 48 to define the main air chamber 44. The main air chamber 44 communicates to a pressure source (see FIG. 6) through a hose 45.

Figure 4:
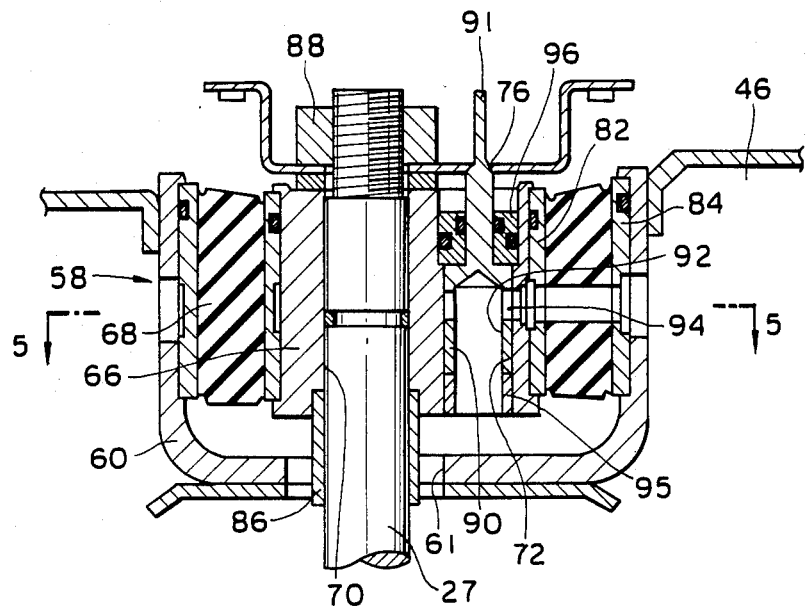
FIG. 4 is an enlarged sectional view of a support section of the air suspension system in FIG. 3.
Figure 5:
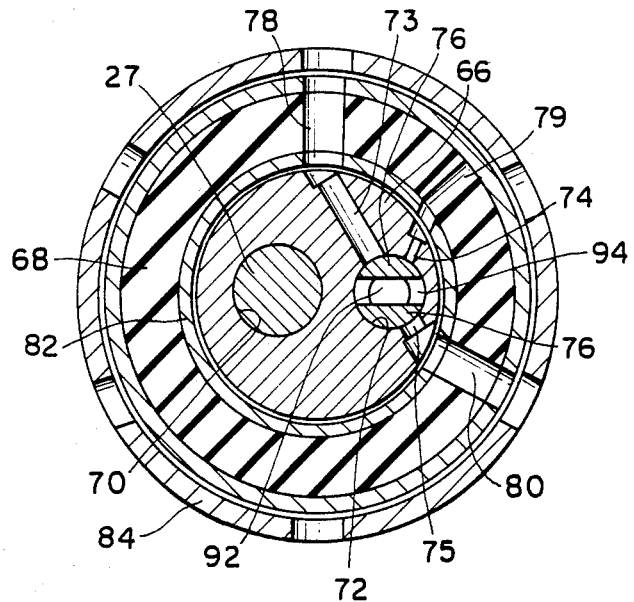
FIG. 5 is a sectional view taken along the line 5—5 in FIG. 4.

The support 58 comprises a rigid member 66, a bushing 68 formed of rubber and said support member 60. The rigid member 66 is formed of high rigidity material like iron having a circular section. As shown in FIGS. 4 and 5, the rigid member 66 has a hole 70 through which the piston rod 27 extends, a hole 72 in which a valve body 76 is disposed and three paths 73,74 and 75 bored diametrally from the hole 72. The bores of the paths 73,75 are equal to each other and larger than that of the path 74.

The bushing 68 is interposed between the rigid member 66 and the support member 60 and has paths 78,79 and 80 extending diametrally. These paths respectively communicate on one hand to the paths 73,74 and 75 in the rigid member 66 through the corresponding paths and an annular groove in the inner tube 82 and on the other hand open to the auxiliary air chamber 46 through the corresponding paths in the outer tube 84 and support member 60. The main and auxiliary air chambers 44,46 communicate to each other through a central hole 61 in the support member 60, paths 73 to 75 in the rigid member 66, paths 78 to 80 in the bushing 68, paths in the support member 60.

The piston rod 27 extends through the hole 70 in the rigid member 66. A ring 86 welded to the piston rod 27 is abutted against the rigid member 66 and a nut 88 is screwed onto the piston rod 27. Thus, the piston rod 27 is connected to the rigid member 66 and kept air-tight by an O-ring.

A valve body 76 has integrally a slide portion 90 and flat portion 91 extending upward through a reduced diameter portion. A hole 92 is bored axially in the slide portion 90 and a path 94 is diametrally opened from the hole 92. When the path 94 is located as shown in FIG. 5, it does not communicate to any of the three paths 73 to 75 in the rigid member 66. Thus, under this condition, the main air chamber 44 is insulated from the auxiliary air chamber 46. When the valve body 76 is rotated 60° clockwise from the position in FIG. 5, the path 94 communicates to the paths 73,75 in the rigid member 66 and the main air chamber 44 communicates completely to the auxiliary air chamber 46. When the valve body 76 is rotated further 60° clockwise, the path 94 communicates to the path 74 in the rigid member 66 and the main air chamber 44 will communicate to the auxiliary air chamber 46 through a throttle.

A cylindrical collar 95 is forced into the hole 72 in the rigid member 66 and the valve body 76 is inserted in an upper side of the collar. Into an upper side of the valve body 76 is forced a holder 96 to which O-rings for sealing are fixed so that the valve body 76 is rotatably disposed in the hole 72 under an air-tight condition.

An actuator 100 consists of a motor and a reduction gear well known per se. Two output shafts 102,104 project from the reduction gear toward the rigid member 66. A bracket 106 of a housing of the actuator is sandwiched between the rigid member 66 and the nut 88 to be fixed to the piston rod 27. Into one output shaft 102 is inserted a flat portion of a control rod 108 disposed rotatably in the piston rod 27 and into the other output shaft 104 is inserted the flat portion of the valve body 76, respectively. Thus, the control rod 108 and the valve body 76 are rotated by the same actuator 100.

Figure 6:
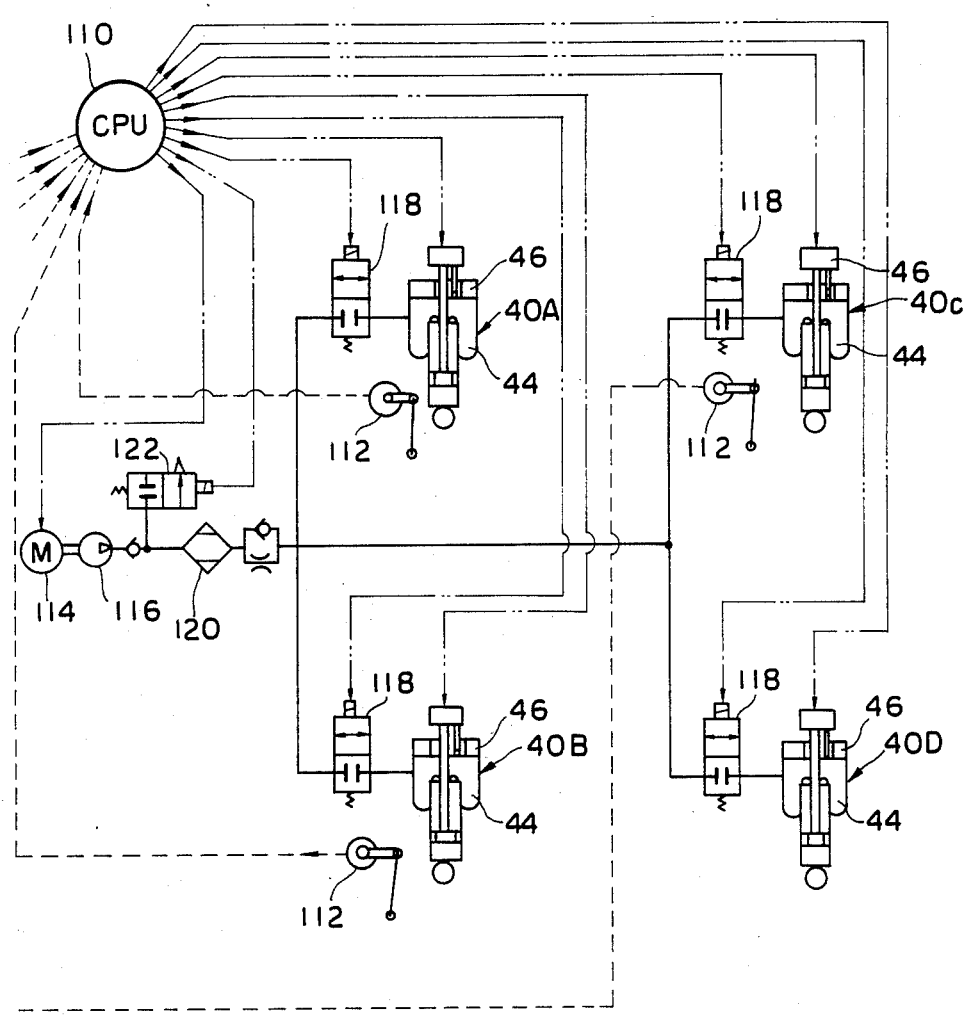
FIG. 6 is a sectional view for explaining the air suspension system and a control unit.

The air suspension system 40 shown in FIG. 3 is used in combination with a control unit 110 as shown in FIG. 6. Four air suspension systems 40A, 40B, 40C and 40D are installed on four positions of at the front, rear, left and right of a vehicle.

Signals from a height sensor 112 and other sensors, i.e., a pressure sensor for detecting the pay load on the vehicle, a vehicle speed sensor, a brake switch, a throttle position sensor, a shift pattern switch, a door switch, upper and lower acceleration sensors or the like each of which judges the travelling condition are sent to the input of the control unit 110. The control unit 110 is a CPU or a computer.

In the control unit 110 is stored previously the external shapes of the air piston 50 corresponding to the car height. The control unit 110 optimizes the spring constant of the air suspension according to the travelling condition on the basis of the shapes of the air piston 50 and the signals of said sensors.

For example, when a vehicle travels on a bad road, the control unit 110 drives on one hand a motor 114 to operate an air compressor 116 and open a levelling valve 118 provided in association with the respective air suspensions. On the other hand, the control unit 110 operates the motor of the actuator 100 of the respective air suspension systems to interrupt communication between the main and auxiliary air chambers 44, 46. As a result, compressed air supplied through a dryer 120 is sent into the main air chamber 44 to increase pressure in the main air chamber. The increase of pressure increases the car height. Then, the control unit 110 not only elevates the car height to a high position, but also selects the car height such that the diaphragm 48 is located at a position on the air piston 50 suited for the travelling condition, that is, in the present embodiment, at a position where the spring constant will increase when a wheel bounds. As a result, only the main air chamber 44 of the air spring 42 is subjected to the spring action and the diaphragm 48 contacts a surface of the preferable external shape of the air piston so that the spring constant of the air suspension 40 is enlarged to restrain bottoming and provide a improved ride comfort and controllability.

When a vehicle travelling with high speed, the control unit 110 operates the motor of the actuator 100 to afford communication between the main and auxiliary air chambers 44, 46 and changes over a change-over valve 122 at the same time to eject compressed air from the main air chamber 44 to the atmosphere and reduce the car height. Then, the control unit 110 adjusts the car height such that, in a bound of a wheel, the diaphragm 48 contacts a surface of the air piston 50 having the shape which can reduce the spring constant or maintain it substantially constant. As a result, by the expansion of the volume of the air spring and external shape of the air piston the spring constant of the air suspension 40 can be reduced to provide a improved ride comfort.

When a vehicle is travelling on a slightly irregular road, the spring constant of the air suspension 40 should be held under the slightly increased condition. For that purpose, from the car height and the shape of the air piston contacting the diaphragm 48 in the car height the control unit judges the condition of the spring constant and concludes whether the car height should be maintained as it is or adjusted slightly upward or downward. Thus, the spring constant is held under the preferable condition.

When a vehicle is of sport type, the control unit 110 operates the actuator 100 such that the path 94 in the valve body 76 opposes to the throttle path 74 in the rigid member 66 while adjusting the car height to bring the diaphragm 48 to the preferable position on the shape of the air piston. Therefore, the most suitable spring constant is obtained for the sport car.

What is claimed is:

1. An air suspension system for a car, comprising:
a shock absorber;
air spring means for adjusting the height of said car by changing the volume of said air spring means and provided with a diaphragm and an air piston contacting with the diaphragm and having a plurality of wall portions arranged longitudinally, each wall portion being different in its external shape from the portion adjacent thereto;
a height sensor and at least one second sensor; and
a control unit for adjusting the spring constant of the air spring according to the travelling condition and which comprises means to which signals from said sensors are sent and in which is stored previously said external shapes of the air piston corresponding to the car height, said control unit including means for adjusting the car height at the same time when the spring constant is to be changed to bring said diaphragm to a position on said air piston is suitable for a travelling condition.

2. An air suspension system for a car, comprising:
a shock absorber;
air spring means for adjusting the height of said car by changing the volume of said air spring means and provided with a diaphragm and an air piston formed to contact with the diaphragm and having a plurality of portions arranged longitudinally, each portion being different in its external shape from the portion adjacent thereto;
a height sensor and at least one second sensor; and
a control unit for adjusting the spring constant of the air spring according to the travelling condition and which comprises means to which signals from said sensors are sent and in which is stored previously said external shapes of the air piston corresponding to the car height, said control unit including means for adjusting the spring constant at the same time the car height is to be changed to bring said diaphragm to a position on said air piston suitable for a travelling condition.

3. An air suspension as claimed in claim 1, wherein said air spring has a main air chamber surrounding the shock absorber and an auxiliary air chamber capable of communicating to or being insulated from the main air chamber.

4. An air suspension system for a car comprising:
a shock absorber;
air spring means for adjusting the car height and including a main air chamber surrounding the shock absorber and provided with a diaphragm and an air piston formed to contact with the diaphragm and having a plurality of wall portions arranged longitudinally, each portion being different in its external shape from the portion adjacent thereto and an auxiliary air chamber capable of communicating to or being insulating from the main air chamber; and
a height sensor and at least one second sensor;
a control unit for adjusting the spring constant of the air spring according to the travelling condition, the control unit including means for affording or interrupting communication between said main and auxiliary air chambers and adjusting at the same time the car height in response to signals received from said sensors to bring said diaphragm to a position when the spring constant is to be largely changed, or the control unit, when the spring constant is to be slightly changed, adjusting at the same time the car height to bring said diaphragm to a position on said air piston suitable for a travelling condition.

5. An air suspension system as claimed in claim 3 or 4, wherein the external shapes of said air piston comprise in combination any two of a straight cylindrical shape, a tapered shape converging downward and a tapered diverging downward shape.

6. An air suspension system as claimed in claim 4, wherein said main and auxiliary air chambers communicate with each other through a throttle path.

7. An air suspension system as claimed in claim 4, wherein said shock absorber includes means for adjusting the damping force.

* * * * *